June 29, 1965 G. M. MILLER 3,192,504

DETECTION OF LONG WAVESHAPES IN AUTOMATIC SYMBOL READER

Filed June 23, 1960 2 Sheets-Sheet 1

INVENTOR.
GEORGE M. MILLER
BY

Samuel E. Turner

INVENTOR.
GEORGE M. MILLER
BY
Samuel E. Turner

United States Patent Office 3,192,504

Patented June 29, 1965

3,192,504

DETECTION OF LONG WAVESHAPES IN AUTOMATIC SYMBOL READER

George M. Miller, Menlo Park, Calif., assignor to General Electric Company, a corporation of New York Filed June 23, 1960, Ser. No. 38,288
12 Claims. (Cl. 340—146.3)

Figure 1:
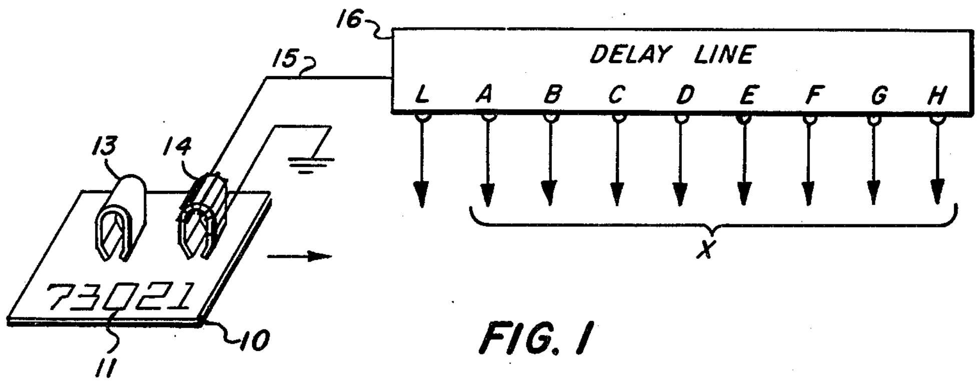

This invention relates to apparatus for automatically reading human language symbols which have been printed on a document with an ink capable of being magnetized and in which each symbol is recognized by its characteristic waveshape which is produced when the symbol is moved relative to a reading transducer. In particular the invention relates to the detection of waveshapes having a length greater than the maximum length of normal symbol waveshapes and to apparatus for reducing the incidence of incorrect reading or rejection of documents because of these long waveshapes.

A United States Patent No. 2,924,812, issued February 9, 1960, to P. E. Merritt and C. M. Steele, for an Automatic Reading System, which is assigned to the same assignee as the instant invention, describes and claims a system for automatically reading human language which is printed on documents as symbols in ink capable of being magnetized. The symbols are magnetized and translated in sequence past a transducer adapted to generate a distinctive electrical waveshape for each symbol. This symbol representing waveshape is applied to a wave transmission means in the form of a delay line which is provided with a plurality of spaced sampling taps for detecting the voltage at corresponding points of the waveshape. For recognition of the waveshape, a plurality of symbol recognition channels, one for each of the waveshapes to be recognized, are each connected to the sampling taps through a respective waveshape correlation network. Each of the channels is thereby adapted to produce an output signal when the corresponding waveshape is in a predetermined position in the delay line. A symbol presence timing circuit is responsive to the leading portion of a waveshape to produce a "sample signal" when the waveshape reaches the predetermined or "sampling" position in the delay line. The sample signal is applied to a gated output circuit from the symbol recognition circuits and a symbol signal on a lead corresponding to the detected symbol is thereby produced.

Printed documents are not perfect and waveshapes therefrom are sometimes distorted from ideal form for various reasons. For example, magnetic wastes such as iron particles are imbedded in the document when it is manufactured and magnetic ink spatters can occur on the document during printing. The reading transducer is responsive to such extraneous magnetic particles as well as to the printed symbols. This often results in a waveshape different from any of the symbol waveshapes and causes an output signal on two or more of the output leads. Apparatus for detecting multiple outputs and for thereupon ignoring the spurious waveshape is disclosed in United States Patent application by P. E. Merritt and C. M. Steele, filed December 29, 1958, Serial No. 783,350, for Spurious Signal Suppression in Automatic Symbol Reader, and assigned to the same assignee as the instant invention.

However, extraneous magnetic particles may be situated in a document ahead of a printed symbol, for example, such that its effect is to combine with the symbol to generate an electrical waveshape significantly similar to the waveshape of a different symbol. Thus an incorrect output can be produced rather than a multiple output. Also, extraneous magnetic particles situated ahead of a symbol can cause premature initiation of the operation of the symbol presence timing circuit with the result that the sample signal is produced before the waveshape reaches the sampling position. An incorrect output signal or multiple output signals can thereupon be produced.

As will be readily appreciated, an extraneous magnetic particle ahead of a symbol produces a waveshape which combines with the symbol waveshape to produce a composite waveshape which can belonger than any normal waveshape. Generally, the symbol portion of such an elongated waveshape is sufficiently undistorted so that it can be correctly identified at a later time. It is thus desirable to inhibit output symbol signals upon detection of an elongated waveshape and to resample the waveshape at a predetermined later time.

It is therefore an object of this invention to provide an improved system for automatically reading human language symbols.

Another object of the invention is to detect waveshapes which are longer than the normal maximum length of symbol waveshapes.

Another object of the invention is to correctly recognize symbol waveshapes which have been elongated by extraneous magnetic material adjacent the symbol.

Another object of the invention is to resample a waveshape upon detection that it is longer than the normal maximum length of symbol waveshapes.

Another object of the invention is to inhibit outputs from symbol recognition channels upon detection of an elongated waveshape.

Another object of the invention is to inhibit resampling in the absence of detection of a long waveshape.

Another object of the invention is to sample a position in a wave transmission device which is unoccupied by a normal waveshape at the moment of sampling.

These and other objects are achieved in a system according to the above mentioned U.S. Patent No. 2,924,812, by providing a wave transmission means in the form of a delay line which is longer than required to contain normal waveshapes. An additional sampling tap, hereinafter called the "long-waveshape" sampling tax, is placed in that portion of the delay line which is unoccupied by a normal waveshape at the moment of sampling. In the illustrated embodiment of the invention, a long-waveshape detection channel is connected to the long-waveshape sampling tap for detecting the presence of a signal thereat at the moment of sampling thereby indicating that an elongated waveshape is in the delay line.

If a signal is thus detected at the long-waveshape sampling tap, symbol output signals are inhibited and the waveshape is again sampled at a time later which is substantially equal to the time for a point of the waveshape to travel from one sampling tap to the next adjacent sampling tap, that is, when the antinodes of the waveshape are next again in alignment with the sampling taps of the delay line.

In the preferred embodiment of the invention the signal at the long-waveshape sampling tap is correlated with the signals produced in the symbol recognition channels. If the signal at the long-waveshape sampling tap is greater in amplitude or within a predetermined percentage below the amplitude of the highest amplitude signal from the symbol recognition channels at the moment of sampling it is deemed significant and the long-waveshape channel produces an output signal in response thereto. This signal is employed to inhibit symbol output signals and to control a resampling circuit. By the use of the correlation technique, rather than a fixed threshold, the range of variations in signals from printed symbols which can be correctly accommodated is greatly increased.

Figure 2:
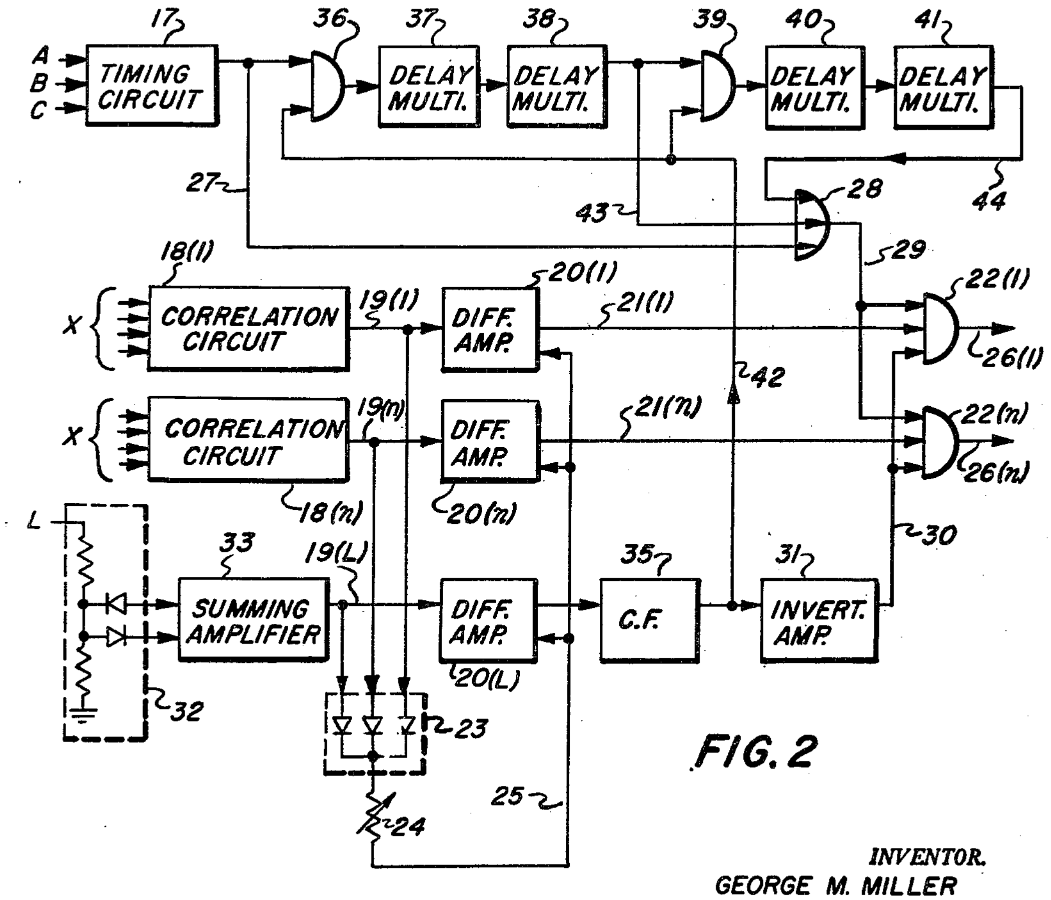
Figure 3:
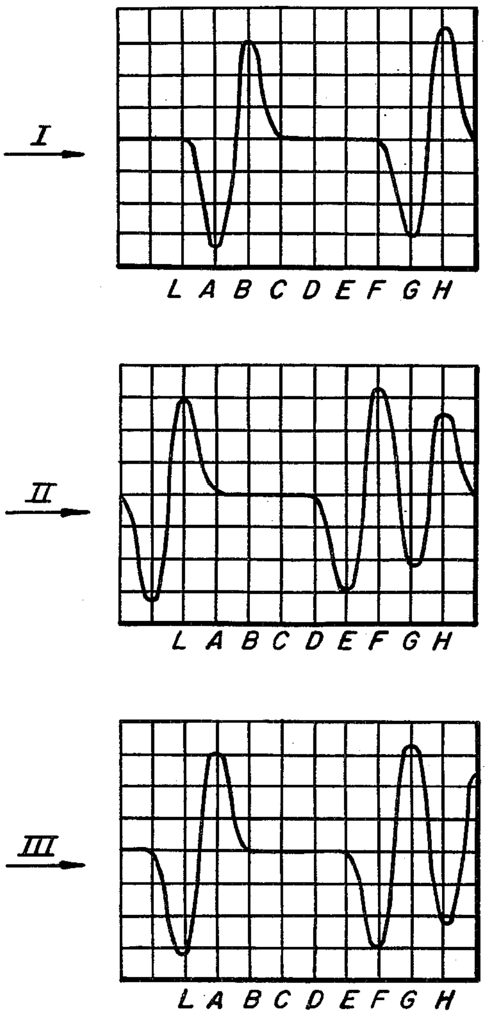

The invention will be described more specifically with reference to the accompanying drawings, wherein:

FIGURE 1 is a schematic illustration of a symbol reading and symbol waveshape transmission apparatus;

FIGURE 2 is a schematic diagram of the circuit of the prefered embodiment of the invention; and FIGURE 3 illustrates certain waveshapes useful in the explanation of the present invention, A complete system for reading magnetic symbols is disclosed in the aforementioned U.S. Patent No. 2,924,812 to which reference is hereby made for a detailed description thereof. Only so much of the reading system is shown herein as is necessary for a full and complete disclosure of the present invention.

Illustrated in FIG. 1 is a document 10 bearing a series of symbols 11 printed in magnetic ink. The document is moved to the right, as indicated in FIG. 1, by mechanism not shown for reading of the symbols. The symbols first pass adjacent a magnetizing magnet 13 illustrated as a permanent magnet. Magnet 13 magnetizes the magnetic material of the document so that signals are produced when the material passes adjacent a reading transducer 14. The distinctive waveshape of the symbol which is produced by transducer 14 when a symbol passes adjacent thereto is fed via a lead 15 to the input terminal of a wave transmission means illustrated as a delay line 16. The delay line is provided with a plurality of sampling taps A–H which are spaced along the delay line in positions corresponding to the possible positive and negative antinodes of the symbol waveshapes when a waveshape is in the reference or sampling position in the delay line. Thus when a waveshape is at the sampling position there exists at the sampling taps A–H a pattern of signal amplitudes by which the symbol can be identified.

When a waveshape is substantially at the sampling position a sample signal is generated by a waveshape presence timing circuit 17 (FIG. 2). The timing circuit is connected to one or more of the sampling taps of the delay line, as is indicated in FIG. 2, and it functions to detect when a waveshape reaches a predetermined position in the delay line and to develop the sample signal in a timed relation thereto.

Each of the sampling taps A–H is connected to each of a plurality of correlation circuits 18(1)–18($n$). The construction, theory and details of operation of such circuits along with a suitable embodiment of timing circuit 17 are disclosed in the aforementioned U.S. Patent No. 2,924,812. wherein a correlation circuit is shown in FIG. 1 and a timing circuit, including elements 125, 132, 134, 136, 138 and 140, is shown in FIG. 6.

Briefly, each correlation circuit includes a correlation network, which is operable to produce an output greater than the output of any other correlation circuit when the waveshape of the symbol corresponding to the correlation circuit is sampled in the delay line. In other words, when a waveshape is sampled, the highest amplitude output signal from the correlation cicuits is produced from the correlation circuit corresponding to the symbol having a waveshape to which the sampled waveshape is most nearly similar.

As illustrated in FIG. 2, each of the correlation circuits 18(1)–18($n$) along with a respective one of a plurality of difference amplifiers 20(1)–20($n$) and a respective one of a plurality of output AND gates 22(1)–22($n$) comprises a symbol recognition channel. For purposes of illustration only two such channels are shown in FIG. 2. However, it is to be understod that there is a separate symbol recognition channel corresponding to each of the symbols to be recognized.

Operation of the circuit, when identifying a normal symbol waveshape, will now be described: When a waveshape is in the delay line, signals of various amplitude will apear on a plurality of output leads 19(1)–19($n$) from the correlation circuits 18(1)–18($n$). As pointed out above, when the waveshape is in the sampling position the highest amplitude signal on the leads 19(1)–19($n$) will be on the lead from the correlation circuit corresponding to the waveshape in the delay line. Circuitry is provided for detecting which of the leads 19(1)–19($n$) has the highest amplitude signal thereupon. This circuitry comprises a peak detector 23, an attenuator 24 and the difference amplifiers 20(1)–20($n$). By this circuitry a signal is produced on the one of a plurality of leads 21(1)–21($n$) in the symbol recognition channel having the highest amplitude signal on the corresponding one of the leads 19(1)–19($n$).

The illustrated embodiment of the peak detector 23 is formed of a series of diodes. Each of the leads 19(1)–19($n$) from the correlation circuits is connected by a respective diode of the peak detector 23 to the input terminal of the attenuator 24. Thus the signal applied from peak detector 23 to the input terminal of the attenuator 24 is substantialy equal to the highest amplitude signal on the leads 19(1)–19($n$).

Each of the leads 19(1)–19($n$) is also connected to a first input terminal of a respective one of the difference ampliers 20(1)–20($n$). The output of the attenuator 24 is applied over a lead 25 to the second input terminals of the difference amplifiers 20(1)–20($n$). Difference amplifiers 20(1)–20($n$) are of the type which provide an output signal only if the signal applied to its first input is greater than the signal applied to its second input . (A suitable difference amplifier is shown by G. E. Valley, Jr., and H. Wallman in 'Vacuum Tube Amplifiers," Section 11.10, McGraw-Hill Book Co., Inc., New York, 1948.) Thus, for example, if the signal on lead 19(1) is greater than the signal on lead 25 the difference amplifier 20(1) will produce an output signal on lead 21(1). Lead 21(1) is connected to an input terminal of the channel output gate 22(1). If this gate is armed, as will be explained hereinafter, a symbol output signal is produced on a symbol output lead 26(1) to thus manifest the identity of the symbol read.

Consider now the purpose of the attenuator 24. If attenuator 24 were not provided it may be readily seen that the one of difference amplifier 20(1)–20($n$) in the channel having the highest amplitude signal on the corresponding one of the leads 19(1)–19($n$) would have this highest signal amplitude on both its first and second inputs. The difference amplifier would therefore not produce an output. On the other hand, if too much attenuation is provided then the signal amplitude on lead 25 to the second inputs of the difference amplifiers could be below the amplitude of the second highest amplitude signal on the leads 19(1)–19($n$). In this case signals on more than one of the leads 21(1)–21($n$) would be produced. Thus the attenuator 24 is adjusted such that the signal provided on lead 25 is normally somewhat greater in amplitude than the second highest amplitude signals on the leads 19(1)–19($n$) upon the sampling of normal waveshapes. Therefore, a normal waveshape causes a signal only on the one of the leads 21(1)–21($n$) in the channel corresponding to the waveshape when the waveshape is in the sample position.

As previously mentioned, the timing circuit 17 produces a sample signal when the waveshape is in the reference or sampling position in the delay line. This sample signal is applied over a lead 27 to one of the input terminals of an OR gate 28. The sample signal is thus applied by gate 28 over a lead 29 to respective sampling input terminals of the channel output gates 22(1)–22($n$). Another input terminal of each of the output gates 22(1)–22($n$) is normally armed, as will be explained hereinafter, over a lead 30 by the output of an inverter amplifier 31. Thus the concurrence of this arming signal on lead 30 with the sample signal on lead 29 and a signal on one of the leads 21(1)–21($n$) results in an output symbol signal on the corresponding one of the leads 26(1)–26($n$).

The foregoing is a brief explanation of the operation of the circuit of FIG. 2 in the identification of normal symbol waveshapes as is more fully explained in the above mentioned U.S. Patent No. 2,924,812. The additional apparatus of FIG. 2 is provided for detecting the occurrence of waveshapes which are longer than any normal waveshape, for inhibiting output symbol signals when a long waveshape is detected and for resampling the waveshape at a later time according to the present invention. For these purposes, a long-waveshape detection channel is provided comprising an input network 32, a summing amplifier 33, a difference amplifier 20(L), a cathode follower 35, and the previously mentioned inverter amplifier 31. Also provided is a resampling signal generating circuit comprising an AND gate 36, a pair of delay multivibrators 37 and 38 for generating a first resampling signal, an AND gate 39, and a pair of delay multivibrators 40 and 41 for generating a second resampling signal. (Suitable embodiments of AND and OR gates for the circuits of FIG. 2 are shown by Abraham I. Pressman in chapter 5 for example of "Design of Transistorized Circuits for Digital Computers," John F. Rider Publisher, Inc., New York, 1959.)

In the following explanation of the long-waveshape detection and resampling circuit of FIG. 2 reference will be made to FIG. 3 which illustrates, by way of example, a series of typical waveshapes shown in the positions which they occupy relative to the sampling taps of the delay line at sample time, that is, upon the occurrence of the sample signal from timing circuit 17. Waveshape I of FIG. 3 is representative of the normal waveshape of the symbol "0" of one system of symbols that has been used. Waveshapes are identified by the position, amplitude and polarity of their positive and negative antinodes. It is to be noted that the "0" symbol waveshape illustrated as waveshape I, FIG. 3, has positive antinodes at sampling taps B and H and negative antinodes at sampling taps A and G in the sampling position.

Waveshape II of FIG. 3 illustrates a typical waveshape resulting from the symbol "0" and an extraneous magnetic particle preceeding the symbol by a distance substantially equal to twice the distance between adjacent sampling taps of the delay line.

Thus the positive antinode at sampling tap H and the negative antinode at sampling tap G of waveshape II are attributable to the extraneous magnetic particle. As previously mentioned, operation of the timing circuit 17 (FIG. 3) is initiated by the leading portion of a waveshape. Thus in the case of a waveshape such as waveshape II (FIG. 3) the timing is initiated by the extraneous magnetic particle and the waveshape II is in the position as shown in FIG. 3 when the sample signal from timing circuit 17 (FIG. 2) is produced. In other words, the extraneous magnetic particle initiates timing and the sample signal is produced before the portion of the waveshape attributable to the symbol has completely entered the symbol waveshape sampling portion of the delay line. It is apparent by inspection that the waveshape II produced by an extraneous magnetic particle followed by a symbol "0" is effectively longer than the normal waveshape of a symbol "0" as illustrated by waveshape I.

For detecting these long waveshapes the delay line shown in FIG. 1 is provided with an additional sampling tap L near the input end of the delay line. Sampling tap L is connected as shown in FIG. 2 to the input network of the long-waveshape detection channel. The input network 32 includes a voltage divider, as shown, to which the long-waveshape sampling tap L is connected. Output is taken from the voltage divider by way of a pair of oppositely poled diodes, as shown. These diodes are connected to respective positive and negative input terminals of the summing amplifier 33. Thus positive or negative voltages appearing at the long waveshape sampling tap L are applied through the input network 32 to the corresponding input terminals of the summing amplifier 33 and in response thereto the summing amplifier produces a signal on a lead 19(L). (A suitable summing amplifier is shown as an amplifier 47 in FIG. 5 of the above mentioned U.S. Patent No. 2,924,812.)

The output terminal of summing amplifier 33 is connected by the lead 19(L) to the first input terminal of a difference amplifier 20(L) which may be of the same type as difference amplifiers 20(1)–20($n$). The output terminal of the summing amplifier 33 is also connected by a diode of the peak detector 23 and by the attenuator 24 and the lead 25 to a second input terminal of difference amplifier 20(L).

Thus it may be seen that the input to the long-waveshape detection channel from long-waveshape sampling tap L is correlated with the input from the symbol sampling taps X to the symbol identification channels. In other words, the output from summing amplifier 33 to the first input of difference amplifier 20(L) must be greater in amplitude than the signal on lead 25 to the second input of difference amplifier 20(L) before the difference amplifier 20(L) produces an output signal. If the signal on lead 19(L) is less than the signal on any one of the symbol identification channel leads 19(1)–19($n$) by a predetermined amount, as determined by attenuator 24, then the difference amplifier 20(L), and hence the long-waveshape detection channel, does not produce an output.

Referring again to the input network 32 it is observed that the voltage divider thereof constitutes a single input correlation network which is designed in relation to the correlation circuits 18(1)–18($n$) such that a waveshape antinode having an amplitude in the order of magnitude of typical symbol waveshape antinodes causes a signal on lead 19(L) which is generally of the order of magnitude of the highest simultaneous signal on the leads 19(1)–19($n$) of the symbol identification channels. Consider for example the waveshape II of FIG. 3 which it will be recalled is formed by a symbol "0" and a preceding extraneous magnetic particle. At sample time the positive antinode voltage at the sampling tap L and the antinode voltages at sample taps E, F, G, and H are applied to the corresponding input terminals of the circuit of FIG. 2. The voltage divider of the network 32 is designed such that under these conditions the output signal on lead 19(L) is sufficient to produce an output from difference amplifier 20(L) thus indicating that there is a long waveshape in the delay line.

The output of difference amplifier 20(L) is applied to the input terminal of the cathode follower 35. The output of the cathode follower 35 is in turn applied to the input terminal of the inverter amplifier 31. As previously mentioned the inverter amplifier 31 is normally operative to produce an arming voltage on the lead 30 to the corresponding input terminals of the channel output gates 22(1)–22($n$). However, when the inverter amplifier 31 receives a signal from cathode follower 35 the output of inverter amplifier 31 becomes low and the channel output gates 22(1)–22($n$) are thereby disarmed. Thus by this circuitry outputs from the symbol identification channels are inhibited upon the detection of a long waveshape.

As previously mentioned, a possible effect of an extraneous magnetic particle ahead of a symbol is that the operation of the timing circuit 17 is prematurely initiated and the sample signal is produced before the portion of the waveshape due to the symbol has completely entered the symbol waveshape sampling portion of the delay line. Circuitry is therefore provided for resampling the waveshape at a later time upon the detection of a long waveshape. As shown in FIG. 2, a lead 42 connects the output terminal of cathode follower 35 to an input terminal of each of the gates 36 and 39. As described above the presence of a long waveshape, such as waveshape II of FIG. 3, in the delay line will cause a signal in the long-waveshape detection channel. Under these conditions the output of the cathode follower 35 will therefore arm the gates 36 and 39 over the lead 42. Thus when the sample signal is produced by timing circuit 17, at sample time, the sample signal will be applied through gate 36 to trigger the delay multivibrator 37. (The well known delay multivibrator is a two state circuit wihch is normally in its reset state and is responsive to a suitable input signal to assume its set state, which state it maintains for a predetermined design period and after which it automatically returns to its reset state.)

The period of delay multivibrator 37 is adjusted such that it substantially equals the time required for the antinodes of the waveshape to travel from one sampling cap to the next sampling tap. When delay multivibrator 37 returns to its reset state it triggers the multivibrator 38. The multivibrator 38 has a relatively short period and its output constitutes a first "resampling" signal on a lead 43.

When this first resampling signal is produced the waveshape II of FIG. 3 will have moved to the position as illustrated by the waveshape III. It is noted that the trailing negative antinode of the waveshape will now be in coincidence with the long waveshape sampling tap L. The long waveshape detection channel consequently again produces an output on lead 30 to disarm the channel output gates 22(1)–22($n$) and therefore inhibit outputs from the symbol identification channels. Also an arming potential is again present on the lead 42 and therefore the gate 39 is armed. Thus, upon the occurrence of the first resampling signal on the lead 43, it is applied through gate 39 to trigger the delay multivibrator 40. Delay multivibrator 40 likewise has a period substantially equal to the time between sampling taps and when the delay multivibrator 39 returns to its reset state it triggers the delay multivibrator 41 to produce a second resampling signal on a lead 44.

The waveshape III of FIG. 3 will now have moved to the position of a normal symbol "0" waveshape as is illustrated by waveshape I. It may be observed that there is now no significant voltage at the long wave sampling tap L. Therefore the long waveshape detection circuit does not produce an output and the inverter amplifier 31 assumes its normal condition such that the voltage on lead 30 arms the channel output gates 22(1)–22($n$). The second resampling signal is applied through gate 28 over lead 29 to the sampling input terminals of the channel output gates 22(1)–22($n$). The "0" symbol identification channel will have a signal on the corresponding one of the leads 21(1)–21($n$). Therefore a symbol channel output signal will be produced on the one of the leads 26(1)–26($n$) corresponding to the symbol "0."

Thus to recapitulate the operation of the apparatus disclosed, when a significant voltage exists at the long-waxeshape sampling tap L at sample time, that is, at the occurrence of the sample signal, the long-waveshape detection channel output inhibits outputs from the symbol identification channels and provides an arming potential so that the resampling circuit is triggered. On the other hand, if no significant voltage exists at the long-waveshape sampling tap, at sample time, the symbol output channel gates are enabled and the resampling circuit is not triggered.

It is noted that in some reading systems it may be desirable to merely cause rejection of the document upon detection of a long waveshape. In which case, it is evident that the signal from the long-waveshape detection channel, say from cathode follower 35, can be employed to initiate operation of document rejection apparatus (not shown).

Also, for some applications it may be desirable to detect for either positive or negative voltages at the long-waveshape sampling tap, but not for both as illustrated. In such case the appropriate diode of input network 32 may be omitted.

While the principles of the invention have been made clear in the illustrative embodiments, there will be obvious that those skilled in the art, many modifications in structure, arrangements, proportions, the elements, materials, and components, used in the practice of the invention, and otherwise, which are particularly adapted for specific environments and operating requirements, without departing from those principles. The appended claims are therefore intended to cover and embrace any such modifications within the limits only of the true spirit and scope of the invention.

What is claimed is:

1. In apparatus for reading symbols printed on a document in magnetic ink by identifying their distinctive symbol waveshapes, means for detecting that a symbol waveshape has been elongated by extraneous magnetic material adjacent a symbol comprising: a magnetic transducer for producing a waveshape in response to magnetic material passing adjacent thereto; a wave transmission means for receiving and propagating said waveshape therealong and having a length greater than the maximum length of symbol waveshapes, said transmission means being provided with a plurality of symbol waveshape sampling taps for sensing points along said waveshape; a plurality of symbol channels connected to said symbol sampling taps for identifying symbol waveshapes and each channel including an output gate; means for developing a sample signal in timed relation to the position of said waveshape in said transmission means; means for applying said sample signal to said output gates; a long-waveshape sampling tap in a portion of said transmission means which is normally unoccupied by a symbol waveshape at the moment of occurrence of said sample signal; and a circuit connected to said long-waveshape sampling tap and responsive to a signal thereat to inhibit said gates.

2. Apparatus for identifying each of the plurality of predetermined waveshapes comprising: wave transmission means for receiving waveshapes; a plurality of sampling taps in said transmission means for delivering waveshape identification signals; an additional sampling tap in said transmission means for delivering a long-waveshape signal indicative of the presence in said transmission means of a waveshape which is longer than any one of said plurality of predetermined waveshapes; a plurality of waveshape identification channels for receiving said waveshape identification signals; means for applying a sample signal to said channels in timed relation to the position of the waveshape in said transmission means; means responsive to said long-waveshape signal to inhibit outputs from said channels; and means responsive to said long-waveshape signal for applying a resample signal to said channels at a time subsequent to said sample signal.

3. In an apparatus for recognizing waveshapes having a predetermined normal maximum length, means for detecting waveshapes which are longer than the normal maximum length comprising: a wave transmission means for propagating waveshapes therealong and having a length greater than required to contain waveshapes of said normal maximum length, said transmission means having spaced sampling taps; sensing means connected to said sampling taps for sensing points along said waveshapes for the identification of different desired waveshapes; an additional sampling tap positioned in a portion of said wave transmission means which is unoccupied by normal length waveshapes at the moment of sensing; and means connected to said additional sampling tap for sensing the presence of a waveshape in said portion of said wave transmission means.

4. In apparatus for recognizing desired waveshapes having a predetermined normal maximum length, means for detecting waveshapes which are longer than said normal maximum length comprising: a wave transmission means for propagating waveshapes therealong and having a length greater than required to contain normal maximum length waveshapes, said transmission means being provided with spaced sampling taps for sensing points along said waveshapes for the identification of waveshapes; and an additional sampling tap positioned in a portion of said wave transmission means which is unoccupied by a normal waveshape at the moment of sensing for providing a signal indicative of a longer waveshape.

5. Apparatus for distinguishing information representing waveshapes having a predetermined maximum length from waveshapes having a length greater than said predetermined maximum length comprising: receiving means having an input for receiving waveshapes and for delivering a plurality of discreet signal samples for the identification of information representing waveshapes, said receiving means having a capacity greater than required to contain information representing waveshapes; and means for delivering a signal sample from a portion of said receiving means normally unoccupied by an information representing waveshape at the moment of sampling for detecting said greater length waveshapes.

6. Apparatus for distinguishing predetermined normal waveshapes from abnormal waveshapes having a length greater than any normal waveshape comprising: receiving means for receiving waveshapes and provided with a plurality of normal waveshape sampling taps for delivering waveshape identification signals; means for sampling said waveshape identification signals; an additional sampling tap in a portion of said receiving means normally unoccupied by a normal waveshape at the moment of sampling; and a circuit connected to said additional sampling tap for providing a signal indicative of an abnormal waveshape.

7. Apparatus for distinguishing predetermined normal waveshapes from abnormal waveshapes having a length greater than any normal waveshape comprising: receiving means for receiving waveshapes and provided with a plurality of normal waveshape sampling taps for delivering waveshape identification signals; means for sampling said waveshape identification signals; an additional sampling tap in a portion of said receiving means normally unoccupied by a normal waveshape at the moment of sampling; a circuit connected to said additional sampling tap for providing a signal indicative of an abnormal waveshape; and means responsive to said signal indicative of an abnormal waveshape for resampling said waveshape identification signals at a predetermined later time.

8. Apparatus for identifying waveshapes comprising: wave transmission means for receiving waveshapes and provided with a plurality of normal waveshape sampling taps for delivering waveshape identification signals; an additional sampling tap positioned in said transmission means ahead of said normal waveshape sampling taps; and a circuit connected to said additionl sampling tap for detecting the presence of a signal thereat.

9. Apparatus for identifying waveshapes comprising: wave transmission means for receiving waveshapes and provided with a plurality of normal waveshape sampling taps for delivering waveshape identification signals; a plurality of waveshape identification channels for receiving said waveshape identification signals; an additional sampling tap positioned in said transmisson means ahead of said normal waveshape sampling taps; and means responsive to a signal at said additional sampling tap to inhibit the operation of said waveshape identification channels.

10. Apparatus for identifying each of a plurality of different waveshapes comprising: means for receiving each waveshape; means for sampling predetermined portions of said receiving means in timed relation to the receipt of said waveshape by said receiving means; and means for sampling at least one additional portion of said receiving means in said timed relation for detecting the presence of a waveshape in said receiving means which is longer than any one of said plurality of different waveshapes.

11. Apparatus for identifying each of a plurality of different waveshapes comprising: means for receiving each waveshape and for delivering waveshape identification signals including a long-waveshape signal indicative of the presence of a waveshape in said receiving means which is longer than any one of said plurality of different waveshapes; a plurality of waveshape identification channels for receiving said waveshape identification signals; and means responsive to said long-waveshape signal to inhibit the operation of said waveshape identification channels.

12. Apparatus for identifying each of a plurality of different waveshapes comprising: means for receiving each waveshape; means for sampling predetermined portions of said receiving means in timed relation to the receipt of said waveshape by said receiving means; means for sampling at least one additional portion of said receiving means in said timed relation for detecting the presence of a waveshape in said receiving means which is longer than any one of said plurality of different waveshapes; and means operable upon detection of said longer waveshape for resampling said portions of said receiving means at a predetermined later time.

References Cited by the Examiner

UNITED STATES PATENTS

| | | | |
|---|---|---|---|
| 2,403,561 | 7/46 | Smith | 340—167 |
| 2,482,544 | 9/49 | Jacobsen | 343—6.5 X |
| 2,648,060 | 8/53 | Turner | 343—6.5 |
| 2,676,206 | 4/54 | Bennett et al. | 324—77 |
| 2,924,812 | 2/60 | Merritt et al. | 340—149 |
| 2,975,404 | 3/61 | Kups | 340—167 |

MALCOLM A. MORRISON, *Primary Examiner.*

IRVING L. SRAGOW, *Examiner.*